United States Patent
Figuereo

(10) Patent No.: US 12,079,809 B1
(45) Date of Patent: Sep. 3, 2024

(54) SECURE FRAMEWORK METHOD FOR COORDINATING AN EVENT PERFORMANCE

(71) Applicant: StageWood Consortium, Inc., Miami Beach, FL (US)

(72) Inventor: Santiago Figuereo, Miami, FL (US)

(73) Assignee: STAGEWOOD CONSORTIUM, INC., Miami Beach, FL (US)

( * ) Notice: Subject to any disclaimer, the term of this patent is extended or adjusted under 35 U.S.C. 154(b) by 249 days.

(21) Appl. No.: 17/542,448

(22) Filed: Dec. 5, 2021

(51) Int. Cl.
- G06Q 20/40 (2012.01)
- G06F 16/27 (2019.01)
- G06Q 20/08 (2012.01)
- G06Q 20/22 (2012.01)
- H04L 9/08 (2006.01)

(52) U.S. Cl.
CPC .......... *G06Q 20/401* (2013.01); *G06F 16/27* (2019.01); *G06Q 20/0855* (2013.01); *G06Q 20/227* (2013.01); *G06Q 2220/00* (2013.01); *H04L 9/085* (2013.01)

(58) Field of Classification Search
CPC ............. G06Q 20/401; G06Q 20/0855; G06Q 20/227; G06Q 2220/00; G06F 16/27; H04L 9/085
See application file for complete search history.

(56) References Cited

U.S. PATENT DOCUMENTS

| | | | | |
|---|---|---|---|---|
| 7,689,463 B1* | 3/2010 | Mesaros | ............ | G06Q 30/0611 705/37 |
| 2015/0302382 A1* | 10/2015 | Reicher | ................ | G06Q 20/227 705/44 |
| 2017/0337521 A1* | 11/2017 | Godbole | ............ | G06Q 10/1095 |
| 2018/0137205 A1* | 5/2018 | Jaeger | ................. | G06F 3/04842 |
| 2018/0352303 A1* | 12/2018 | Siddique | ............. | H04L 65/1069 |
| 2022/0076219 A1* | 3/2022 | Filter | ................... | G06Q 20/065 |

OTHER PUBLICATIONS

PR Newswire, "RABBL Announces Fan-Generated Crowdsourcing For Concerts: Bridging the Gap Between Artist and Fan, RABBL Gives Audiences a Voice," New York, Apr. 23, 2014.*

\* cited by examiner

*Primary Examiner* — Nathan Erb
(74) *Attorney, Agent, or Firm* — CRGO Global; Steven M. Greenberg

(57) ABSTRACT

A secure framework method for coordinating an event performance includes receiving a selection by fans of a performer and a selection of a venue for a performance by the performer on a date certain, receiving from the performer, a cost for the performer to perform at the venue on the date certain, and from the venue, a cost for the performer to perform at the venue on the date certain. The method also includes accessing a user interface to a distributed ledger, and directing, by way of a logical operation of the distributed ledger exposed by the user interface, an embedding of the received costs into an immutable contract. Finally, responsive to receiving a notification of an assenting to the immutable contract by the performer and the venue, a message is transmitted directing a release of crowdsourced funds from the fans to the performer and venue.

6 Claims, 3 Drawing Sheets ic voucher being distributable to the fans of the initial subset.

SECURE FRAMEWORK METHOD FOR COORDINATING AN EVENT PERFORMANCE

BACKGROUND OF THE INVENTION

Field of the Invention

The present invention relates to the field of concert promotion and more particularly to the crowd-sourced scheduling of a concert performance.

Description of the Related Art

Concert promotion refers to the any portion of the process of planning, marketing and producing a live performance by an entertainer to a large group of spectators. While customarily associated with musical and comedic performances, concert promotion also encompasses orchestral performances, political and celebrity appearances, theater both traveling and fixed location, symphony, sporting events and live spectacles such as tradeshows, auto shows, air shows, boat shows and the like. The general features of concert promotion include the selection of a venue at a specific geographic location for use on a specific date, and the selection of one or more performers to perform at the selected venue on the specific date.

Much of concert promotion is reflects and exercise in scheduling in which the promoter selects a performer likely to draw a maximized audience willing to purchase an entrance ticket to the selected venue on the appointed date in order to experience the performance. The choice of venue largely depends upon the capacity of the venue and the ability for the selected performer to draw enough commercial interest in paying attendees to fill the available seats within the venue. As can be seen, then, for the concert goer, the ability to attend a concert performance of interest at a convenient time and date at a venue geographically proximate to the concert goer largely depends upon the choices of a single individual or small group of individuals charged with the responsibility to schedule concert performances irrespective of the precise identity of the chosen performer, selected venue and chosen date of the performance.

The task of arranging a concert performance, then, can be quite complex and given the seemingly vast number of available performance and the unprecedented diversity of taste amongst prospective concert goers, the task of optimally arranging a concert performance can be nearly impossible for such a small number of decision makers. Consequently, venues remain vacant, sub-optimally utilized, and so many prospective performers remain on the sidelines, untapped at times when the performer is otherwise able to perform. Most importantly, the consuming community of prospective concert goers remain unsatisfied in their inability to attend a live performance of an entertainer of choice at a venue of reasonable geographic proximity and on a date of convenience.

BRIEF SUMMARY OF THE INVENTION

Embodiments of the present invention address technical deficiencies of the art in respect to concert promotion. To that end, embodiments of the present invention provide for a novel and non-obvious method for a secure framework method for coordinating an event performance. Embodiments of the present invention also provide for a novel and non-obvious computing device adapted to perform the foregoing method. Finally, embodiments of the present invention provide for a novel and non-obvious data processing system incorporating the foregoing device in order to perform the foregoing method.

In an embodiment of the invention, a secure framework method for coordinating an event performance includes receiving into a data structure in memory of a host computing platform from over a computer communications network, a selection by a multiplicity of fans of a performer and a selection of an event venue for a performance by the performer on a date certain. The method also includes receiving into the data structure from over the computer communications network from the performer, a cost for the performer to perform at the event venue on the date certain, and additionally, from the event venue, a cost for the performer to perform at the event venue on the date certain.

The method yet further includes accessing a user interface to a distributed ledger remotely disposed over the computer communications network, and directing, by way of a logical operation of the distributed ledger exposed by the user interface, an embedding of the received costs into an immutable contract. In this regard, the immutable contract is a smart contract disposed within the distributed ledger with individual terms of the immutable contract, including the cost for the performer to perform at the event venue on the date certain, and the cost for the performer to perform at the event venue on the date certain, stored in a ledger location accessible with a shared encryption key. Finally, in response to receiving a notification of an assenting to the immutable contract by the performer and the event venue, the method includes transmitting a message over the computer communications network directing a release of crowdsourced funds from the multiplicity fans to the performer and venue.

In one aspect of the embodiment, the method additionally includes recording for an initial subset of the fans, credit card information and receiving from the initial subset, an authorization to use the credit card information to request a fixed charge that is less than a proportionate amount of the cost for the performer. Then, in response to receiving a commitment from a number of the fans such that the per fan cost for the performer across the number of fans is equivalent to the fixed charge, the method includes issuing a credit card charge for each of the fans to account for the cost of the performer to perform at the event venue on the date certain.

Optionally, the method additionally includes, subsequent to the commitment, receiving credit card information from a follow-on subset of the fans each specifying an authorization to charge the per fan cost, recomputing a per fan proportion of the fixed charge for the fans of the initial subset and the follow-on subset and computing a difference between the per fan cost for the performer for the initial subset and the recomputed per fan proportion and charging a credit card of each fan of the follow-on subset for an amount of the recomputed per fan proportion and refunding onto a credit card of each of the fans of both the initial subset, the computed difference. Alternatively, a credit card of each fan of the follow-on subset can be charged for an amount of the fixed cost and onto a credit card of each of the fans of both the initial subset, a pro rate portion of a sum total of the computed difference for the fans of the follow-on subset can be refunded. As yet another alternative, a credit card of each fan of the follow-on subset can be charged for an amount of the fixed cost, an electronic voucher can be generated in an amount of a pro rata portion for the fans of the initial subset of a sum total of the computed difference for the fans of the follow-on subset, and the electronic voucher can be messaged to a mobile computing device of each of the fans of the initial subset.

In another embodiment of the invention, a data processing system is adapted for securely coordinating an event performance. The system includes a host computing platform with one or more computers, each having memory and at least one processor. The system also includes a performance scheduling module. The module includes computer program instructions enabled while executing in the memory of at least one of the processing units of the host computing platform to receive into a data structure in memory of the host computing platform from over a computer communications network, a selection by a multiplicity of fans of a performer and a selection of an event venue for a performance by the performer on a date certain, and to receive into the data structure from over the computer communications network from the performer, a cost for the performer to perform at the event venue on the date certain, and yet further to receive into the data structure from over the computer communications network from the event venue a cost for the performer to perform at the event venue on the date certain.

The program instructions additionally are enabled to access a user interface to a distributed ledger remotely disposed over the computer communications network, and to direct, by way of a logical operation of the distributed ledger exposed by the user interface, an embedding of the received costs into an immutable contract. Finally, the program instructions are enabled to respond to a receipt of a notification of an assenting to the immutable contract by the performer and the event venue, by transmitting a message over the computer communications network directing a release of crowdsourced funds from the multiplicity fans to the performer and venue.

In even another embodiment of the invention, a computing device including a non-transitory computer readable storage medium having program instructions stored therein, which are executable by at least one processing core of a processing unit, are enabled to cause the processing unit to perform a method for securely coordinating an event performance. The method includes the receipt into a data structure in memory of a host computing platform from over a computer communications network, of a selection by a multiplicity of fans of a performer and a selection of an event venue for a performance by the performer on a date certain. The method also includes the receipt into the data structure from over the computer communications network from the performer, of a cost for the performer to perform at the event venue on the date certain, and, from the event venue, of a cost for the performer to perform at the event venue on the date certain.

The method yet further includes an accessing of a user interface to a distributed ledger remotely disposed over the computer communications network, and the direction, by way of a logical operation of the distributed ledger exposed by the user interface, of an embedding of the received costs into an immutable contract. Finally, the method includes a response to receiving a notification of an assenting to the immutable contract by the performer and the event venue, by transmitting a message over the computer communications network directing a release of crowdsourced funds from the multiplicity fans to the performer and venue.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for securely coordinating an event performance. In accordance with an embodiment of the invention, different fans submit a selection of a performer and a venue at which the performer is sought by the fans to perform on a specified date or during a range of dates. Credit card information is also received from the different fans with an authorization to charge up to a fixed amount in exchange for an admissions ticket to the proposed performance. Thereafter, the proposed terms of the performance are written to an immutable contract remotely disposed within a distributed ledger and the terms of the proposed performance along with access information to the immutable contract are provided to the performer and the venue. Upon detecting an accession to the terms with a written entry to the immutable contract by each of the performer and the venue, the credit card funds are charged and released to the performer and the venue.

Figure 1:
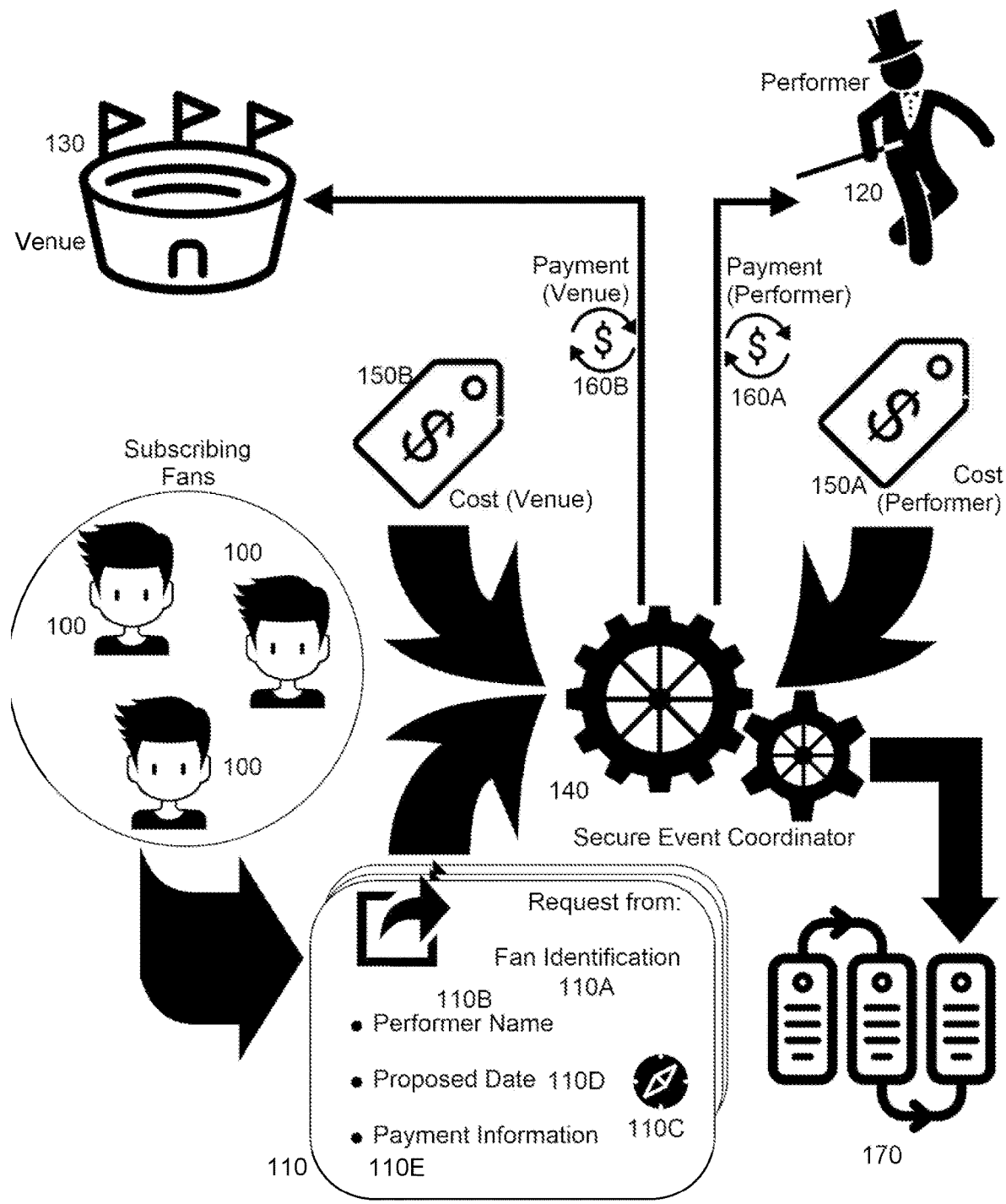
FIG. 1 is a pictorial illustration reflecting different aspects of a process of securely coordinating an event performance.

In illustration of one aspect of the embodiment, FIG. 1 pictorially shows a process of securely coordinating an event performance. As shown in FIG. 1, different fans 100 may submit respectively different performance requests 110 to a secure event coordinator 140. Each of the requests 110 specifies an identification of the submitting one of the fans 100, a name of a desired performer 110B, a proposed geographic location 110C for a corresponding performance by the desired performer 110B, a proposed date 110D for the performance, and payment information 110E, for instance credit card information of the submitting one of the fans 100. The secure event coordinator 140 processes each of the requests 110, until a threshold number of the fans 100 have requested the same name of the desired performer 110B for a performance at the proposed geographic location 110C within a range of dates of the proposed date 110D. In this regard, the threshold number can be a pre-determined number of attendees paying a market rate ticket price sufficient to produce an aggregate amount of ticket revenue sufficient to support a performance at a specific venue 130 located within proximity to the geographic location 110C.

Upon a threshold number of fans 100 requesting the same name of the desired performer 110B for a performance at the proposed geographic location 110C within a range of dates of the proposed date 110D, the secure event coordinator 140 creates a smart contract 170 incorporating the terms of a proposed performance for a performer 120 with the name of the desired performer 110B at the specific venue 130 within the range of dates of the proposed date 110D, including a deposit requirement consistent with the proposed ticket price paid by the threshold number of the fans 100. The smart contract 170 is written to a ledger entry of a distributed ledger so as to render the ledger entry immutable in terms of the content of the ledger entry. The secure event coordinator 140 then transmits a message to the performer 120 (or an agent thereof) and also to the specific venue 130 (or an agent thereof). The performer 120 responds by writing to the smart contract 170 a proposed cost of performance 150A, and the specific venue 130 likewise responds by writing to the smart contract 170 a proposed cost of the venue 150B. To the extent that the aggregate of the costs 150A, 150B falls below the aggregate amount of ticket revenue for the threshold number of the fans 100, the smart event coordinator 140 issues a payment directive to a merchant accounting system for each of the requests of the threshold number of the fans 100 and then issues additional payment directives to the merchant accounting system to credit payment 160A to an account for the performer 120 in the amount of the cost of performance 150A, and to credit payment 160B to an account for the venue 130 in the amount of the cost of the venue 150B.

Figure 2:
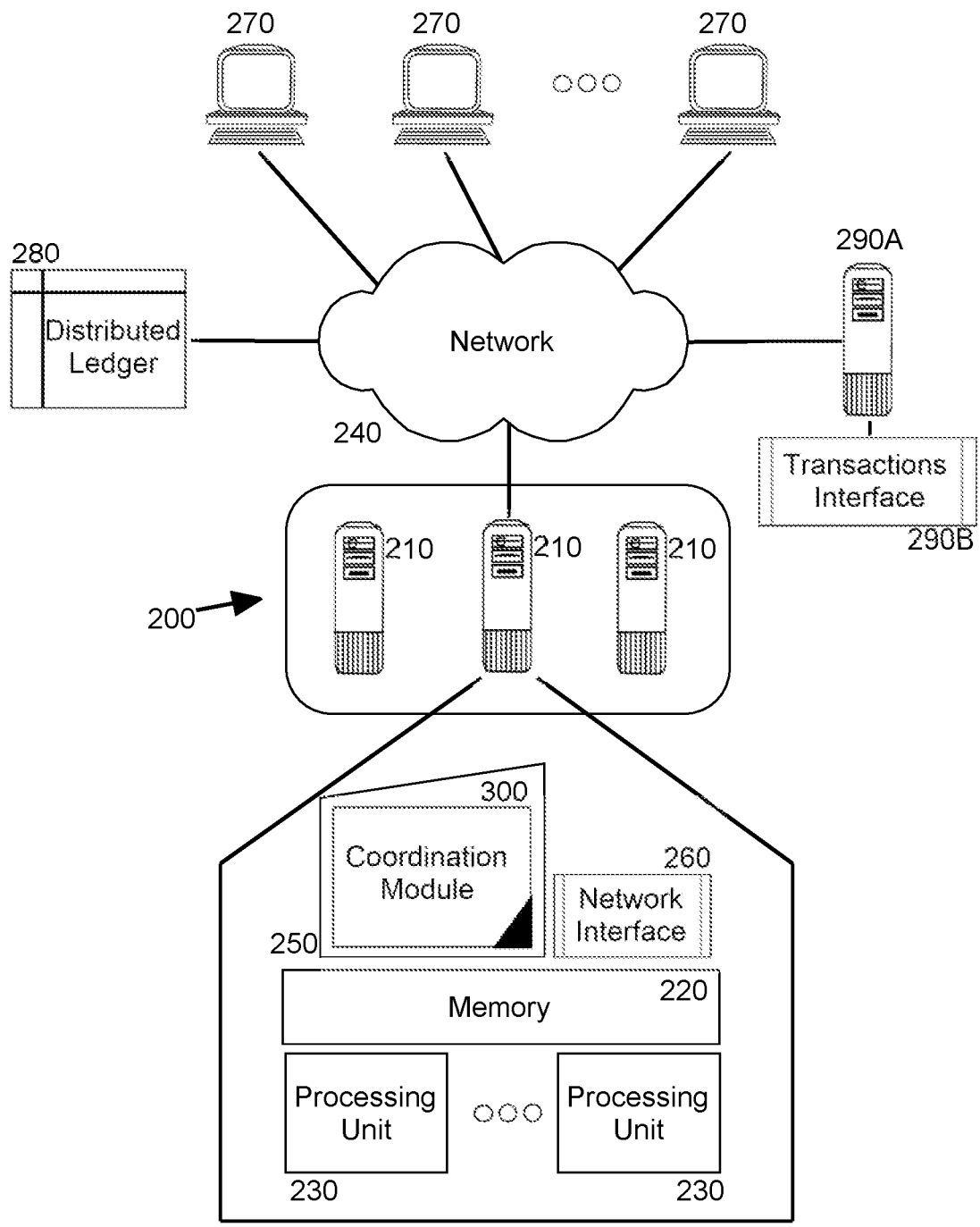
FIG. 2 is a block diagram depicting a data processing system adapted to perform one of the aspects of the process of FIG. 1; and, FIG. 3 is a flow chart illustrating one of the aspects of the process of FIG. 1.

Aspects of the process described in connection with FIG. 1 can be implemented within a data processing system. In further illustration, FIG. 2 schematically shows a data processing system adapted to securely coordinate an event performance. In the data processing system illustrated in FIG. 1, a host computing platform 200 is provided. The host computing platform 200 includes one or more computers 210, each with memory 220 and one or more processing units 230. The computers 210 of the host computing platform 200 (only a single computer shown for the purpose of illustrative simplicity) can be co-located within one another and in communication with one another over a local area network, or over a data communications bus, or the computers can be remotely disposed from one another and in communication with one another through network interface 260 over a data communications network 240.

Notably, a computing device 250 including a non-transitory computer readable storage medium can be included with the data processing system 200 and accessed by the processing units 230 of one or more of the computers 210. The computing device stores 250 thereon or retains therein a program module 300 that includes computer program instructions which when executed by one or more of the processing units 230, performs a programmatically executable process for securely coordinating an event performance. Specifically, the program instructions during execution receive from different fans by way of corresponding client computing devices 270 from over data communications network 240, respective requests for a performance by a named performer at a specified geographic location on a specified date or within a date range. Each of the requests additionally include credit card payment information.

The program instructions compute a threshold number of requests for the same performance during the same date range at a specific venue within the same geographic location at a typical price of admissions necessary to support the cost of the proposed performance. Thereafter, the program instructions respond to the receipt of a number of requests equal to or in excess of the computed threshold number by generating a smart contract within a ledger entry of a distributed ledger 280 immutably incorporating the terms of the performance. The program instructions then transmit to each of the performer and venue credentials necessary to access the distributed ledger 280 and the smart contract. The program instructions then respond to a writing to the smart contract in the distributed ledger 280 of a proposed cost to perform by the performer and a proposed cost to host the performance by the venue, by invoking through a transactions interface 290B of a remotely disposed transactions server 290A, a payment request with the credit card information of each of the requests. Finally, the program instructions issue a payment request to the transactions interface 290B paying the performer and the venue the proposed costs.

Figure 3:
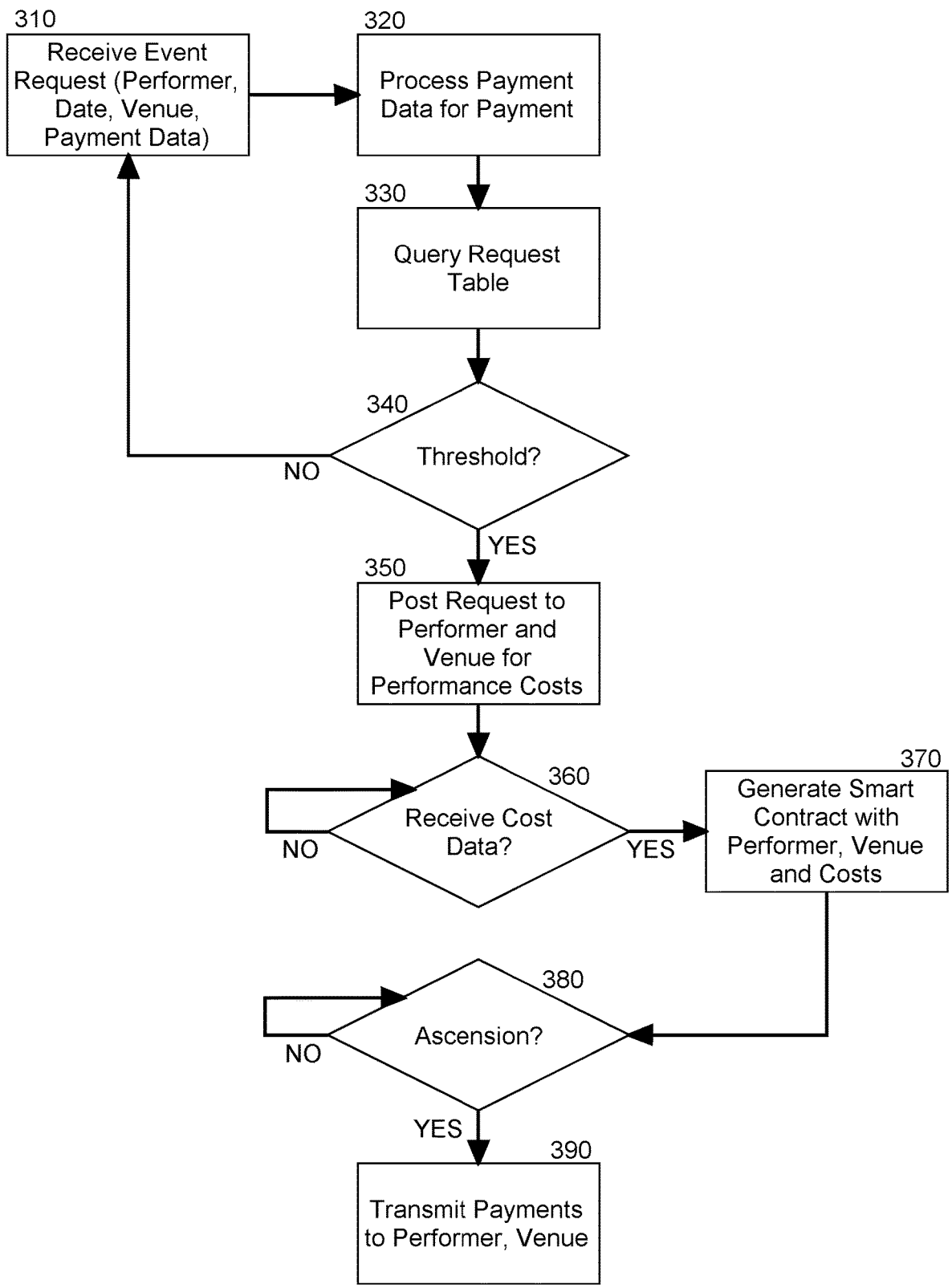

In further illustration of an exemplary operation of the module, FIG. 3 is a flow chart illustrating one of the aspects of the process of FIG. 1. Beginning in block 310, an event request is received from a fan within a message including a specified performer, date range for a performance by the performer, geographic location for the performance and payment data for the purchase of an admissions ticket to the performance at a generalized rate consistent with a market rate for performances within the geographic location by performers within a similar genre of the specified performer. In block 320, payment is processed in response to the request using the credit card information in the amount of the generalized rate. Then, in block 330 a request table tabulating all received requests is queried for all requests for the specified performer within the date range at any venue within the geographic location. In decision block 340, if a threshold number of requests are tabulated sufficient to exceed a pre-determined cost of the specified performance, the process continues through block 350. Otherwise, the process returns to block 310.

In decision block 340, if it is determined that a threshold number of requests have been tabulated that represent a sufficient amount of payments received from corresponding fans in support of the specified performance so as to meet or exceed the pre-determined cost of the specified performance, in block 350, a message is posted to the specified performer and venue soliciting performance costs. In decision block 360, upon detecting receipt of the performance costs from the venue and performer, in block 370 a smart contract is immutably stored in a distributed ledger incorporating the performance costs. Then, upon receipt of an indication of acceptance by the venue and performer in decision block 380, the specified payments are transmitted to the performer and venue.

Of note, subsequent to the transmission of the payments to the performer and venue, additional requests may be received from additional fans seeking to coordinate the specified performance. In this event, a per fan proportion of the fixed charge can be computed for the additional fans along with the initial fans and a difference computed between the per fan cost for the performer for the initial fans, and the recomputed per fan proportion. Consequently, a credit card of each subsequent fan is charged for an amount of the recomputed per fan proportion and the credit card of each of the initial fans receives a credit of the computed difference. Alternatively, a credit card of each subsequent fan is charged the fixed cost initially charged to the initial fans and a pro rata portion of a sum total of the computed difference is refunded only onto the credit cards of the initial fans. As yet another alternatively, an electronic voucher can be generated in the amount of a pro rata portion of the computed difference and messaged to a mobile computing device of each of the initial fans.

Of import, the foregoing flowchart and block diagram referred to herein illustrate the architecture, functionality, and operation of possible implementations of systems, methods, and computing devices according to various embodiments of the present invention. In this regard, each block in the flowchart or block diagrams may represent a module, segment, or portion of instructions, which includes one or more executable instructions for implementing the specified logical function or functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

More specifically, the present invention may be embodied as a programmatically executable process. As well, the present invention may be embodied within a computing device upon which programmatic instructions are stored and from which the programmatic instructions are enabled to be loaded into memory of a data processing system and executed therefrom in order to perform the foregoing programmatically executable process. Even further, the present invention may be embodied within a data processing system adapted to load the programmatic instructions from a computing device and to then execute the programmatic instructions in order to perform the foregoing programmatically executable process.

To that end, the computing device is a non-transitory computer readable storage medium or media retaining therein or storing thereon computer readable program instructions. These instructions, when executed from memory by one or more processing units of a data processing system, cause the processing units to perform different programmatic processes exemplary of different aspects of the programmatically executable process. In this regard, the processing units each include an instruction execution device such as a central processing unit or "CPU" of a computer. One or more computers may be included within the data processing system. Of note, while the CPU can be a single core CPU, it will be understood that multiple CPU cores can operate within the CPU and in either instance, the instructions are directly loaded from memory into one or more of the cores of one or more of the CPUs for execution.

Aside from the direct loading of the instructions from memory for execution by one or more cores of a CPU or multiple CPUs, the computer readable program instructions described herein alternatively can be retrieved from over a computer communications network into the memory of a computer of the data processing system for execution therein. As well, only a portion of the program instructions may be retrieved into the memory from over the computer communications network, while other portions may be loaded from persistent storage of the computer. Even further, only a portion of the program instructions may execute by one or more processing cores of one or more CPUs of one of the computers of the data processing system, while other portions may cooperatively execute within a different computer of the data processing system that is either co-located with the computer or positioned remotely from the computer over the computer communications network with results of the computing by both computers shared therebetween.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A secure framework method for coordinating an event performance comprising:
   receiving into a data structure in memory of a host computing platform from over a computer communications network, a selection by a multiplicity of fans of a performer and a selection of an event venue for a performance by the performer on a date certain;
   receiving into the data structure from over the computer communications network from the performer, a cost for the performer to perform at the event venue on the date certain, and additionally receiving into the data structure from over the computer communications network from the event venue a cost for the performer to perform at the event venue on the date certain;
   accessing a user interface to a distributed ledger, on computing hardware, remotely disposed over the computer communications network, and directing, by way of a logical operation of the distributed ledger exposed by the user interface, an embedding of the received costs into an immutable contract; and
   responsive to receiving a notification of an assenting to the immutable contract by the performer and the event venue, transmitting a message over the computer communications network directing a release of crowdsourced funds from the multiplicity of fans to the performer and the event venue;
   wherein the crowdsourced funds are provided by fans by:
      recording for an initial subset of the fans, credit card information and receiving from the initial subset, an authorization to use the credit card information to request a first charge that is less than a proportionate amount of a total cost for the performer and the event venue;
      responsive to receiving a commitment from a number of the fans such that the proportionate amount of the total cost for the performer and the event venue is equal to the first charge, issuing a credit card charge for each of the number of the fans to account for the total cost;
      subsequent to the commitment, receiving credit card information from a follow-on subset of the fans each specifying an authorization to charge a recomputed proportionate amount of the total cost;

recomputing a proportionate amount of the total cost for the fans of the initial subset and the follow-on subset and computing a difference between the first charge and the recomputed proportionate amount of the total cost; and, charging a credit card of each fan of the follow-on subset for the first charge and refunding onto a credit card of each of the fans, of the initial subset, the difference between the first charge and the recomputed proportionate amount of the total cost.

2. The method of claim 1, wherein the immutable contract is a smart contract disposed within the distributed ledger with individual terms of the immutable contract, including the cost for the performer to perform at the event venue on the date certain, stored in a ledger location accessible with a shared encryption key.

3. A data processing system adapted for securely coordinating an event performance, the system comprising:

a host computing platform comprising one or more computers, each comprising memory and at least one processor; and, a performance scheduling module comprising computer program instructions enabled while executing in the memory of at least one of the processors of the host computing platform to perform:

receiving into a data structure in memory of the host computing platform from over a computer communications network, a selection by a multiplicity of fans of a performer and a selection of an event venue for a performance by the performer on a date certain;

receiving into the data structure from over the computer communications network from the performer, a cost for the performer to perform at the event venue on the date certain, and additionally receiving into the data structure from over the computer communications network from the event venue a cost for the performer to perform at the event venue on the date certain;

accessing a user interface to a distributed ledger, on computing hardware, remotely disposed over the computer communications network, and directing, by way of a logical operation of the distributed ledger exposed by the user interface, an embedding of the received costs into an immutable contract; and responsive to receiving a notification of an assenting to the immutable contract by the performer and the event venue, transmitting a message over the computer communications network directing a release of crowdsourced funds from the multiplicity of fans to the performer and the event venue;

wherein the crowdsourced funds are provided by fans by:

recording for an initial subset of the fans, credit card information and receiving from the initial subset, an authorization to use the credit card information to request a first charge that is less than a proportionate amount of a total cost for the performer and the event venue;

responsive to receiving a commitment from a number of the fans such that the proportionate amount of the total cost for the performer and the event venue is equal to the first charge, issuing a credit card charge for each of the number of the fans to account for the total cost;

subsequent to the commitment, receiving credit card information from a follow-on subset of the fans each specifying an authorization to charge a recomputed proportionate amount of the total cost;

recomputing a proportionate amount of the total cost for the fans of the initial subset and the follow-on subset and computing a difference between the first charge and the recomputed proportionate amount of the total cost; and, charging a credit card of each fan of the follow-on subset for the first charge and refunding onto a credit card of each of the fans, of the initial subset, the difference between the first charge and the recomputed proportionate amount of the total cost.

4. The system of claim 3, wherein the immutable contract is a smart contract disposed within the distributed ledger with individual terms of the immutable contract, including the cost for the performer to perform at the event venue on the date certain, stored in a ledger location accessible with a shared encryption key.

5. A computing device comprising a non-transitory computer readable storage medium having program instructions stored therein, the instructions being executable by at least one processing core of a processing unit to cause the processing unit to perform a method for securely coordinating an event performance, the method including:

receiving into a data structure in memory of a host computing platform from over a computer communications network, a selection by a multiplicity of fans of a performer and a selection of an event venue for a performance by the performer on a date certain;

receiving into the data structure from over the computer communications network from the performer, a cost for the performer to perform at the event venue on the date certain, and additionally receiving into the data structure from over the computer communications network from the event venue a cost for the performer to perform at the event venue on the date certain;

accessing a user interface to a distributed ledger, on computing hardware, remotely disposed over the computer communications network, and directing, by way of a logical operation of the distributed ledger exposed by the user interface, an embedding of the received costs into an immutable contract; and, responsive to receiving a notification of an assenting to the immutable contract by the performer and the event venue, transmitting a message over the computer communications network directing a release of crowdsourced funds from the multiplicity of fans to the performer and the event venue;

wherein the crowdsourced funds are provided by fans by:

recording for an initial subset of the fans, credit card information and receiving from the initial subset, an authorization to use the credit card information to request a first charge that is less than a proportionate amount of a total cost for the performer and the event venue;

responsive to receiving a commitment from a number of the fans such that the proportionate amount of the total cost for the performer and the event venue is equal to the first charge, issuing a credit card charge for each of the number of the fans to account for the total cost;

subsequent to the commitment, receiving credit card information from a follow-on subset of the fans each specifying an authorization to charge a recomputed proportionate amount of the total cost;

recomputing a proportionate amount of the total cost for the fans of the initial subset and the follow-on subset and computing a difference between the first charge and the recomputed proportionate amount of the total cost; and, charging a credit card of each fan of the follow-on subset for the first charge and refunding onto a credit card of each of the fans, of the initial subset, the difference between the first charge and the recomputed proportionate amount of the total cost.

6. The device of claim 5, wherein the immutable contract is a smart contract disposed within the distributed ledger with individual terms of the immutable contract, including the cost for the performer to perform at the event venue on the date certain, stored in a ledger location accessible with a shared encryption key.

\* \* \* \* \*